United States Patent Office 3,356,482
Patented Dec. 5, 1967

3,356,482
FERTILIZER COMPRISING A SALT OF A SUGAR PHOSPHATE ESTER
Ian Sargent Ogle, Cronulla, New South Wales, and Bruce M. Smythe, Roseville, New South Wales, Australia, assignors to The Colonial Sugar Refining Company Limited, Sydney, New South Wales, Australia, a company of New South Wales
No Drawing. Filed Oct. 5, 1966, Ser. No. 584,328
9 Claims. (Cl. 71—11)

ABSTRACT OF THE DISCLOSURE

The invention involves a mixed fertilizer including a water soluble salt of a sugar phosphate ester.

---

This application is a continuation-in-part of prior, co-pending application of the same inventors, Serial No. 471,470, filed July 12, 1965 and now abandoned.

This invention relates to plant nutrition and particularly to the application of organic phosphate compositions to plants and to soil to provide nutrients for the plants and to condition the soil. Still more particularly, the invention relates to the use of certain hydrophilic sugar phosphate esters as plant nutrients by foliar and soil application.

The mechanisms by which mineral elements are transported across cell membranes or absorbed through the leaves of plants are not well understood; nonetheless, the foliar application to plants of micronutrients such as iron, copper, zinc and manganese, has been practised satisfactorily for many years. Recently, as reported by A. M. Berrie, Physiologia Plantarum, 13, 9–19 (1960), it has been found that a 10% solution of sucrose sprayed on tomatoes can be absorbed through the leaves and this has been found to result in an increase in the dry weight of the plant. Again recently, this method of foliar application has been invoked to supply plants with phosphate, nitrogen and magnesium.

The general conclusion in the art appears to be that there is little advantage to be gained by the foliar application of inorganic phosphates.

A major object of the invention is to provide an improved type of plant nutrient.

Another object of the invention is to provide hydrophilic organic phosphate fertilizers for foliar application to plants.

Another object of the invention is to provide improved plant nutrients comprising hydrophilic organic phosphate compositions containing selected micronutrients.

A further object of the invention is to provide an improved plant nutrient comprising a complexing sugar phosphate.

Yet an additional object of the invention is to provide improved plant nutrients in water-soluble or colloidal form comprising hydrophilic organic phosphates in admixture with inorganic fertilizer salts.

These and other important and related objects will be clearly apparent from the subsequent description.

It has now been discovered that compositions particularly suitable for use as plant nutrients, both by foliar application and application to the soil, are formed when a sugar such as sucrose is phosphorylated in the presence of a selected metal compound. As will be seen more fully hereinafter and as has been described in co-pending United States patent applications Serial Nos. 262,230 filed March 1, 1963, and 414,074 filed Nov. 27, 1964, such sugar phosphates may readily be prepared by the reaction of phosphorus oxychloride with a solution of the sugar in the presence of calcium oxide or hydroxide or carbonate, to produce a complex mixture of various sugar phosphates containing some inorganic phosphate. Such sugar phosphates are initially made in the form of calcium salts, but a series of salts may be produced therefrom by simple replacement of the cation, for example by potassium, sodium, ammonium, pyridinium, and other organic bases, for example, various alkaloids, cyclohexylamine and the like. The sugar phosphates of the invention have physical and physicochemical characteristics which adapt them peculiarly well for use as plant nutrients and as soil conditioners. In addition to being able to form a large series of salts, such phosphate esters are capable of forming complexes with various cations.

Generally speaking, the metal salts of sucrose phosphate are very soluble in water and this is also true of the salts of sucrose phosphate with organic bases such as alkaloids, cyclohexylamine and the like. This is in sharp contradistinction to the inorganic phosphates which, with the exception of the phosphates of alkali metal, ammonia and lower molecular weight substituted ammonium ions, are relatively insoluble in water. It appears that the attachment of the very hydrophilic sucrose moiety to the phosphate groups in such salts increases their solubility to such an extent that they dissolve in aqueous solution. This solubilizing influence of the sugar moiety probably depends on the number and configuration of the hydroxyl groups. In aqueous solutions of sugars these hydroxyl groups are hydrogen bonded to water molecules and this accounts for the high solubility of sugars generally in water.

The organic phosphate compounds of the invention are hydrophilic substances and are characterized by being strongly adsorbed at interfaces, a fact which renders them particularly effective in foliar application. Aqueous solutions of these compounds also exhibit reduced surface tension thereby increasing their wetting action for leaf surfaces when used in spray applications.

The present invention is concerned with the use of sugar phosphate compounds closely approximating compounds occurring naturally in the sugar-containing transport fluids of plants, whereby to make available for plant nutrition the main plant nutrients, such as nitrogen, phosphorus, potassium and calcium, and various micronutrients; additionally a source of carbohydrate is provided by the sugar moiety of such compounds. A particular advantage of foliar fertilizers of the aforesaid type is that all the nutrients are immediately available to the plant and considerably smaller quantities need to be applied as compared with quantities necessary in the case of soil fertilizer applications. The compounds of the invention, by reason of their hydrophilic properties, also present special utility as soil conditioners when applied to the soil in the usual manner.

As contemplated herein, the compositions of the invention comprehend improved fertilizers comprised of sugar phosphate such as a sucrose phosphate in the form of its various salts and complexes, particularly incorporating those elements involved in plant nutrition, such as sodium, nitrogen, potassium, calcium and phosphorus, but also incorporating various trace minerals or micronutrients.

Some of the compositions of the invention which are of value in foliar sprays are the complexes of sugar phosphates with calcium, magnesium, copper, iron, zinc and manganese. Balanced foliar fertilizers and soil fertilizers consisting of mixtures of the various selected salts and complexes may be readily prepared.

As previously noted, the sugar phosphates employed in and for the production of the compositions of the invention may be prepared by reacting a sugar, sucrose for instance, with phosphorus oxychloride in a suitable reaction solvent and in the presence of stoichiometric amounts of calcium oxide or hydroxide as shown in Example 1, below.

EXAMPLE 1

As an example of this procedure 350 grams of sucrose is dissolved in 1.5 liters of distilled water, 140 grams of calcium oxide is suspended in the solution, which is mixed and cooled to 0° C. A solution of 153.4 grams of phosphorus oxychloride dissolved in 150 ml. of trichloroethylene is added slowly, while vigorously agitating the reaction mixture in a cooling bath to maintain the temperature at approximately 0° C. The addition of the oxychloride solution requires about three hours.

Upon completion of the reaction the mixture is filtered and the filtrate concentrated to approximately 60% solids. This concentrate is added slowly with vigorous agitation to sufficient ethanol to yield a final concentration of 80% of ethanol by volume. The calcium sucrose phosphate is precipitated as a fine white powder which is filtered off and dried. This product contains about 12% calcium chloride which may be removed by repeating the precipitating procedure five or six more times.

Other salts of sucrose phosphate may be made from the calcium salt by simple replacement of the cation. One effective method comprises passing an aqueous solution of the calcium salt through a cation exchange resin in hydrogen form to remove the calcium, then neutralizing the ester solution with a selected base containing the desired metal, for example, sodium hydroxide.

Additional methods of preparing the sugar phosphate salts of ions other than calcium include (i) double-decomposition reactions, which precipitate the extraneous ions as an insoluble salt, and (ii) the direct neutralization of sucrose phosphoric acid by the corresponding base (if soluble) or with an excess of the freshly-precipitated hydroxide.

EXAMPLE 2

The preparation of stannous sucrose phosphate serves as an example of the double-decomposition reaction. A solution of 50 grams of calcium sucrose phosphate in 500 ml. of water is added slowly, with agitation, to a solution of 24.6 grams of stannous fluoride in 500 ml. of water. The insoluble calcium fluoride is removed by filtration and the stannous sucrose phosphate solution is evaporated to dryness at 50° C. under vacuo.

The acid-base neutralization reaction may be illustrated by the preparation of sodium sucrose phosphate. Sucrose phosphoric acid is prepared by passing a calcium sucrose phosphate solution through a column charged with a cation exchange resin in the acid form, the calcium ions thereby being exchanged for hydrogen ions. The stoichiometric equivalent of sodium hydroxide is then added to neutralize the acid.

The preparation of nickel sucrose phosphate illustrates the preparation of a metal ion salt by reacting the sucrose phosphoric acid with excess freshly precipitated metal ion hydroxide. After removal of excess nickel hydroxide by filtration, the nickel salt is recovered by evaporation of the filtrate to dryness.

The invention also comprehends the use of the novel organic phosphates in combination or association with inorganic fertilizers. The high aqueous solubility of the sucrose phosphate salts and complexes facilitates the absorption of the associated inorganic fertilizers and confers improved balanced properties of composite fertilizers. Thus, when mixed with nitrogenous foliar nutrients such, for example, as urea, the subject organic phosphates improve the carbon-nitrogen balance and reduce the degree of leaf burn and similar necrotic effects usually associated with foliar application of high nitrogen compounds.

Complexes of metals such as iron with ethylenediaminetetraacetic acid, as is known, are presently used for commercial application for prevention of chlorosis in citrus trees. Soluble complexes of di- and trivalent metals with sucrose phosphate, for instance potassium ferric phosphate, provide an effective and cheap material for this purpose.

EXAMPLE 3

The preparation of potassium ferric sucrose phosphate may be achieved by first replacing the calcium of calcium sucrose phosphate by potassium ions, followed by the addition of ferric ions at a suiatble pH. By way of example, a solution of 100 gm. of calcium sucrose phosphate in 100 ml. of water is added slowly to a solution of 48.2 gm. of potassium oxalate in 200 ml. of water. The precipitate of calcium oxalate thus formed is removed by filtration. Then, 20 ml. of 10% ferric chloride solution and 14 ml. of 4% sodium hydroxide solution is added to the filtrate. The characteristic deep-red color of the complex appears and the potassium salt of the complex is precipitated, as an oil, on the addition of alcohol. The oil is dried to a brown powder under vacuum at 40° C.

The copper, manganous, cobalt and the like complexes may be prepared in a similar fashion and the potassium ion may be replaced by other suitable cations.

In foliar application, compositions of the invention can be applied to the plants in any suitable means, for example in aqueous solution as a spray, fog, foam or coating, and optionally can be mixed with other foliar nutrients, insecticides, fungicides, hormones or other agricultural chemicals normally applied to leaves, shoots, stalks or seeds. The characteristic properties of the organic phosphates of the invention have been found to enhance the absorption of supplemental nutrients by the plant and the absorption can be further enhanced by the use of detergents or surfactants, such as nonionic surfactants. The high aqueous solubility of the organic phosphates of the invention when added to soil increases the availability of neutrients from the soil both when used alone or in admixture with other organic or inorganic fertilizers.

The sugar phosphates of the invention can form hydrophilic colloids which, when moistened in the soil, serve to retain water in the soil and regulate the uptake of water soluble fertilizers and nutrients by the plant. Thus, they act as soil conditioning agents. They appear to act at the plant root level to retard leaching of fertilizers and natural soil nutrients and tend to exert a chelating or complexing action on trace minerals, rendering them more readily assimilable by the plant.

For soil fertilization a single compound may be employed, such as calcium sucrose phosphate; alternatively, admixtures may be employed of several sucrose phosphates of different specific plant nutrient values, such as potassium, sodium and/or ammonium sucrose phosphates; again when desired, the single sugar phosphate or the admixture of sugar phosphates may be admixed with complexed trace metal salts of sucrose phosphates in the proper balance required for the particular plant. The special characteristics of sugar phosphate salts can also be utilized in preferred fertilizing compositions comprising a formulation of a selected quantity of chosen sugar phosphate admixed with typical commercially available inorganic fertilizers, such as ammonium sulfate, urea, sodium nitrate, calcium nitrate, potassium sulfate, potassium chloride, potassium nitrate, superphosphate, double and triple superphosphate, ground phosphate rock, etc., in admixture with a diluent, such as gypsum, to prevent caking of the fertilizer and insure good drillability. The several fertilizer constituents may be admixed in conventional mixers in the respective amounts to give the desired ultimate balanced fertilizers, such, for example, as 2–8–2 or other mixtures, adapted or recommended for a particular plant or crop.

The utility of hydrophilic sugar phosphates as improved sources of calcium and phosphate, for example, in growing organisms is illustrated by the following example.

EXAMPLE 4

Batches of soybeans previously conditioned to 13% moisture and stored in cans at room temperatures for 6 months were dipped for 10 minutes respectively in the following solutions:

(i) 0.5% solution of calcium sucrose phosphate prepared by the phosphorylation procedure of Example 1;
(ii) 0.5% solution of monopotassium phosphate;
(iii) 0.5% solution of sucrose;
(iv) 0.5% solution of sucrose plus lime, containing calcium in amount equivalent to that for (i).

With solution (i), seed viability was markedly increased, being improved by an average of about 30% compared with a control batch. With solution (ii), there was a lesser effect, and with solutions (iii) and (iv) there was no demonstrated increase in viability.

As well as increasing viability it was found that the treatment with solution (i) also resulted in a marked increase in radicle growth. Compared with a control batch, the improvement in this respect for the solution (i) batch amounted to 50% (based on dried radicle weight). The improvement for the solution (ii) batch was slight (10% compared with the control); and there was no significant increase in radicle growth for solutions (iii) and (iv).

It is evident from the foregoing that it is possible to utilize with advantage the compositions which are subject of the invention to provide for plants and animals soluble readily-assimilable phosphates, essential metals and trace metals (e.g. calcium, magnesium, copper, iron, zinc).

EXAMPLE 5

An example of a useful fertilizer composition in accordance with the present invention which contains nitrogen, potassium, phosphorus as well as calcium in a form readily available to plants, is set forth below in Table I.

*Table I*

[Formulation basis—one ton, total]

| Component: | Weight, lb. |
|---|---|
| Monopotassium phosphate | 500 |
| Diammonium phosphate | 500 |
| Calcium sucrose phosphate (prepared as in Example 1) | 1000 |

The amount of the sugar phosphate ester salt employed in such formulations may be widely varied depending on the degree of solubility desired and/or the soil conditioning effect sought. It will be understood that to secure a desired ratio of nitrogen, phosphorus and potassium, the quantities and type of the inorganic components in such formulations will be correlated with the quantity of the sugar phosphate ester salt and the particular cation of the salt.

The foliar plant formulation may be initially prepared as a powder or concentrated aqueous solution and can be transported to the site of application before diluting to the desired ultimate concentration.

It will be understood that while the invention has been described with particular reference to sucrose phosphates the scope of the invention is not limited to this compound and its salts but embraces similar phosphoric esters and ester salts of sugars generally, typical other members of the class being glucose, fructose, galactose, arabinose, maltose, lactose, raffinose, and the like. The phosphate esters of these sugars may be prepared by means of a procedure similar to that described for the preparation of calcium sucrose phosphate.

While preferred compounds and their fertilizer application have been described it will be understood that these are given didactically to illustrate the general utility in the field of plant nutrition of compounds of this class having physical, chemical and physicochemical characteristics similar to those of the particular illustrative compounds. The invention therefore is not intended to be limited by the illustrative examples except as such limitations are clearly imposed by the appended claims.

We claim:

1. A balanced organic fertilizer comprising a selected mixture of calcium, potassium and ammonium salts of sugar phosphate esters.

2. A balanced organic fertilizer comprising a selected mixture of calcium, potassium and ammonium salts of sucrose phosphate.

3. A balanced organic fertilizer providing nitrogen, phosphorus and potassium values comprising a mixture of salts of sucrose phosphate.

4. A mixed fertilizer comprising a mixture of at least one inorganic water soluble salt having fertilizer value and water soluble salt of a sugar phosphate ester.

5. A mixed fertilizer comprising a mixture of inorganic water soluble salts having fertilizer values and a water soluble salt of sucrose phosphate.

6. A mixed fertilizer comprising a mixture of inorganic water soluble salts having fertilizer values and a plurality of water soluble salts of sucrose phosphate.

7. A mixed fertilizer comprising a mixture of a non-caking diluent and water soluble salts having fertilizer values and water soluble salts of sucrose phosphates providing calcium and potassium values.

8. A mixed fertilizer comprising a mixture of a non-caking diluent and water soluble inorganic compounds containing nutritionally available nitrogen, potassium and phosphorus and a soluble salt of sucrose phosphate complexed with a nutritionally valuable trace metal.

9. A mixed fertilizer as defined in claim 4 in which the salt of a sugar phosphate ester is calcium sucrose phosphate.

References Cited

FOREIGN PATENTS 247,809    6/1912    Germany.

DONALL H. SYLVESTER, *Primary Examiner.*

T. D. KILEY, *Assistant Examiner.*